US005362614A

United States Patent [19]

Serizawa et al.

[11] Patent Number: 5,362,614

[45] Date of Patent: Nov. 8, 1994

[54] PHOTOGRAPHIC PRINTING PAPER SUPPORT

[75] Inventors: Shinichiro Serizawa; Shigehisa Tamagawa, both of Fujinomiya, Japan

[73] Assignee: Fuji Photo Film Co., Ltd., Kanagawa, Japan

[21] Appl. No.: 195,035

[22] Filed: Feb. 14, 1994

[30] Foreign Application Priority Data

Feb. 12, 1993 [JP] Japan .................................. 5-046023

[51] Int. Cl.$^5$ ......................... G03C 1/78; D21H 1/10; B32B 23/08

[52] U.S. Cl. .................................... 430/538; 162/135; 162/158; 162/169; 162/183; 428/328; 428/414; 428/478.4; 428/513

[58] Field of Search ................ 430/538; 162/135, 158, 162/169, 183; 428/328, 478.4, 414, 513

[56] References Cited

U.S. PATENT DOCUMENTS

| | | | |
|---|---|---|---|
| 3,630,830 | 12/1971 | Herdle et al. | 430/538 |
| 4,517,285 | 5/1985 | Woodward et al. | 430/538 |
| 4,675,245 | 6/1987 | von Meer et al. | 430/538 |
| 4,820,582 | 5/1989 | Merz et al. | 430/538 |
| 4,940,656 | 6/1990 | Tamagawa et al. | 430/538 |

*Primary Examiner*—Jack P. Brammer

*Attorney, Agent, or Firm*—Sughrue, Mion, Zinn, Macpeak & Seas

[57] ABSTRACT

Disclosed is a photographic printing paper support which comprises a raw paper having polyolefin resin coats on the both sides, with the raw paper being made from pulp slurry containing an epoxidized higher fatty acid amide and/or an alkylketene dimer and a cationic substance other than epoxidized higher fatty acid amides by the addition thereinto in an early stage of the preparation and further containing anionic colloidal silica and/or anionic bentonite added in a late stage of the preparation after controlling the pulp concentration so as to range from 0.1 to 1.5%.

13 Claims, No Drawings

PHOTOGRAPHIC PRINTING PAPER SUPPORT

FILED OF THE INVENTION

The present invention relates to a photographic printing paper support and, more particularly, to a support for photographic printing paper which not only uses a raw paper in which improvement of the drainage on wire cloth in a paper-making step is effected, but also enables considerable reduction of the developer penetration via the border as cut surfaces.

BACKGROUND OF THE INVENTION

In order to prevent processing solutions from penetrating into a photographic printing paper support in developing and fixing steps and to reduce processing times including washing and drying times, waterproof supports comprising a raw paper covered with a polyolefin such as polyethylene on both sides have been preferably used for photographic printing paper in recent years.

As for the raw paper, so-called acidic paper has so far been used. The acidic paper is prepared from paper stock to which an anionic sizing agent, an anionic paper-strength reinforcer and a cheap aluminum salt for fixing these anionic chemicals to pulp are added, thereby being rendered acidic.

Recently, however, neutral paper has prevailed as paper for general use because of its advantages, e.g., in having improved durability with respect to paper strength, enabling white water discharged in the paper-making step to be disposed in a closed system, preventing equipment from being corroded, and so on.

In case of raw paper's being used for a photographic printing paper support, it is required thereof to be hard sized paper in order to inhibit a developer from penetrating into the support via the cut surfaces during development. In using neutral paper as the raw paper for a photographic printing paper support, therefore, it becomes necessary to incorporate therein not only an alkylketene dimer having self fixability as sizing agent but also a cationic polyacrylamide as paper strength reinforcer.

The papermaking in the neutral region (6.0≦ the pH of paper stock ≦7.5) is inferior to the papermaking in the acidic region (3.5≦ the pH of paper stock <6.0) in the drainage on wire cloth. Accordingly, the former papermaking has a problem of its suffering an increase in drying load. Further, it has drawbacks that the alkylketene dimer used therein as sizing agent is responsible for stains on rolls such as press rolls and tends to render the raw paper surfaces slippery.

As a result of our intensive studies for solving the above-described problems, it has now been found out that not only the drainage on wire cloth in a papermaking step and squeezability with a wet press can be improved but also a drying load can be reduced when a raw paper is made from the pulp slurry to which (i) as a sizing agent an epoxidized higher fatty acid amide is added in combination with another cationic substance is added and (ii) anionic colloidal silica and/or anionic bentonite is further added after the pulp concentration is controlled so as to range from 0.1 to 1.5%. Moreover, we have found out that the thus made raw paper has excellent smoothness and high paper strength and can considerably reduce the penetration of a developer thereinto via the cut surfaces when it is covered with a polyolefin on the both sides and used as photographic printing paper support, thus achieving the present invention.

SUMMARY OF THE INVENTION

Therefore, an object of the present invention is to provide a method of preparing neutral paper which not only enables paper stock to have satisfactory drainage on wire cloth in a papermaking step but also does not cause the generation of stains on rolls.

Another object of the present invention is to provide a photographic printing paper support into which a developer can hardly penetrate upon development.

The above-described objects of the present invention are attained with a photographic printing paper support which comprises a raw paper having polyolefin resin coats on the both sides, said raw paper being paper made from pulp slurry containing not only an epoxidized higher fatty acid amide and/or an alkylketene dimer but also another cationic substance which are added in an early stage of the preparation and further containing anionic colloidal silica and/or anionic bentonite which is added in a late stage of the preparation after controlling the pulp concentration so as to range from 0.1 to 1.5%.

DETAILED DESCRIPTION OF THE INVENTION

Epoxidized higher fatty acid amides used in the present invention function as sizing agent. Specific examples thereof include the condensation products of fatty acids and polyamines as disclosed, e.g., in JP-B-38-20601 (the term "JP-B" as used herein means an "examined Japanese patent publication"), JP-B-39-4507, U.S. Pat. No. 3,692,092, and the reaction products of alkenylsuccinic acids and polyamines as disclosed in JP-A-51-1705 (the term "JP-A" as used herein means an "unexamined published Japanese patent application).

Of the fatty acids as cited above, those preferred in the present invention are aliphatic mono- and polycarboxylic acids containing 8 to 30, especially 12 to 25, carbon atoms. Specific examples of such aliphatic carboxylic acids include stearic acid, oleic acid, lauric acid, palmitic acid, arachic acid, behenic acid, tall oil fatty acid, alkylsuccinic acid, alkenylsuccinic acid, and so on. In particular, behenic acid is favored over others.

As for the polyamines, polyalkylenepolyamines, especially those having two or three amino groups, are preferable.

Specific examples of such polyamines include diethylenetriamine, triethylenetetramine, tetraethylenepentamine, pentaethylenehexamine, dipropylenetriamine, tripropylenetetramine, aminoethylethanolamine, and so on.

The reaction of an aliphatic carboxylic acid with a polyamine is carried out under a condition such that the quantity of amino groups is in excess of that of carboxyl groups. Herein, the reaction product may be modified, if needed, in order to render the sizing agent fine in grain size by making the product further react with urea, adipic acid, maleic acid, phthalic acid, formic acid, formaldehyde or the like, or by carrying out the reaction in the presence of rosin petroleum resin, $\alpha$, $\beta$-unsaturated polybasic acid-added rosin, $\alpha$, $\beta$-unsaturated polybasic acid-added petroleum resin or the like as disclosed in JP-B-42-2922, JP-B-45-28722 and JP-A-50-116705. These substances, which serve for modification of the cationic sizing agent prepared from an aliphatic carboxylic acid and a polyamine, are used in such an amount as not to have bad effects on whiteness and sizing capability.

In order to render the reaction products of aliphatic carboxylic acids with polyamines soluble or dispersible in water, it is required to convert them into salts by making them react with an inorganic or organic acid or to modify them using an alkyl halide, benzyl chloride, ethylene chlorohydrin, epichlorohydrin, ethylene oxide or the like so as to have the form of quaternary salt. For additional purposes of enabling the reaction products to retain their cationic character in a wide range of pH and preventing the sizing agent from falling off the pulp by mechanical agitation, it is preferable to convert them into quaternary salts.

In particular, it is favored to convert them into quaternary salt via the reaction with epichlorohydrin, because the resulting salts can provide a great sizing effect.

The epoxidized higher fatty acid amides are added in a proper amount, provided that the proportion thereof to the bone dry pulp is not greater than 2.0% by weight, preferably within the range of 0.1 to 2.0% by weight.

As for the alkylketene dimer used in the present invention, those represented by the following general formula (A) are examples thereof:

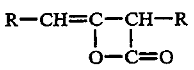

(A)

wherein R represents an alkyl group containing 8 to 30 carbon atoms.

Of the foregoing alkylketene dimers, those containing as R an alkyl group containing 12 to 20 carbon atoms are preferred. In particular, the alkylketene dimers containing as R an alkyl group containing 20 carbon atoms are used to most advantage.

In adding an alkylketene dimer as illustrated above to the pulp slurry, it is preferably used in the form of emulsion prepared by dispersing them together with a cationized starch and/or a surfactant by means of an emulsifying machine.

A suitable proportion of the alkylketene dimer is in the range of 0.05 to 5% by weight, preferably 0.1 to 1.5% by weight, based on bone dry pulp.

Suitable examples of a cationic substance used in combination with the foregoing epoxidized higher fatty acid amides and/or the foregoing alkylketene dimers include cationic polyacrylamides, amphoteric polyacrylamides, cationized starch, water-soluble aluminum salts, polyamidepolyamine epichlorohydrins, and so on. These substances may be used as a mixture of two or more thereof.

The above-cited cationic polyacrylamides can be obtained by copolymerizing acrylamides and cationic monomers (which are therefore called the cationic polyacrylamides of copolymer type, hereinafter), and it is preferable for them to have a molecular weight of from 50 to $1.5\times10^6$, particularly from $0.7\times10^6$ to $1.0\times10^6$. In addition, it is desirable that their cation number be within the range of 1.5 to 5.0, In determining the molecular weights of ingredients used in the present invention, GPC method (which stands for gel permeation chromatography) is adopted.

As for the cationic monomers which can be copolymerized with acrylamides, compounds represented by the following general formulae (I) and (II) respectively and salts thereof are preferred:

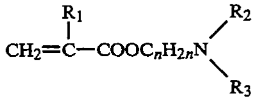

(I)

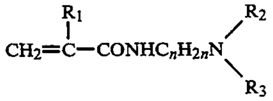

(II)

wherein $R_1$ represents a hydrogen atom or a lower alkyl group, $R_2$ and $R_3$ each represent a lower alkyl group, and n represent an integer of from 1 to 5.

Specific examples of the foregoing cationic monomers are illustrated below, but the invention should not be construed as being limited to these examples.

① Dimethylaminoethyl methacrylate $CH_2{=}C(CH_3)COOCH_2CH_2N(CH_3)_2$

② Diethhylaminoethyl methacrylate $CH_2{=}C(CH_3)COOCH_2CH_2N(CH_2CH_3)_2$

③ Quaternary ammonium salt prepared from dimethylaminoethyl methacrylate and methyl chloride $[CH_2{=}C(CH_3)COOCH_2CH_2N(CH_3)_3]\cdot Cl$ ④ Dimethylaminopropyl acrylamide $CH_2{=}CHCONHCH_2CH_2CH_2N(CH_3)_2$ Also, there can be used terpolymers obtained using (meth)acrylic acid as the third comonomer in the copolymerization of acrylamides and cationic monomers.

The cation number of each cationic polyacrylamide of copolymer type can be determined by carrying out the following experiment and using the equation shown below: About 0.1 g of the sample is weighed out accurately, diluted with a diluent [a 89:10:1 (by volume) mixture of water, methanol and acetic acid] and then titrated with a 1/400N of potassium polyvinyl sulfate (abbreviated as "PVSK" hereinafter).

Cation Number=titrated value (ml)$\times$(1/400) factor (PVSK)/sample weight (g)$\times$(nonvolatile matter (%)/100)

Additionally, the proportion of the nonvolatile matter is determined by the following procedures: $3.0\pm0.2$ g of the sample is put in a schale (50 mm$\times$15 mm), spread uniformly, weighed accurately, dried for 3 hours with a $105\pm5°$ C. circulating air dryer, allowed to stand for 30 minutes in a desiccator, and then weighed accurately to determine the weight of the matter remaining on drying. The proportion is calculated from these two weighed values.

It is desirable that a cationic polyacrylamides as described above be used in a proportion of 0.1 to 3.0% by weight, based on bone dry pulp.

Amphoteric polyacrylamides which can be used as cationic substance in the present invention are amphoteric copolymers prepared using not only acrylamide or methacrylamide as main constituent monomer but also both anionic and cationic monomers as comonomers. These copolymers are preferable to have an average molecular weight ranging from $2.0\times10^6$ to $5.0\times10^6$, particularly from $2.0\times10^6$ to $3.5\times10^6$, when measured by GPC method.

Suitable examples of an anionic monomer as described above include acrylic acid, methacrylic acid, itaconic acid and so on. In particular, itaconic acid is preferred over others.

Suitable examples of a cationic monomer which can copolymerize with acrylamide or methacrylamide include dialkylaminoalkyl methacrylates represented by the foregoing formula (1) and salts thereof, and dialkylaminoalkyl acrylamides represented by the foregoing formula ( 2 ) and salts thereof.

It is desirable that the above-described amphoteric polyacrylamides be used in a proportion of 0.01 to 5.0% by weight, particularly 0.2 to 3.0% by weight, based on bone dry pulp.

In addition, anionic polyacrylamides may be used in the present invention. Anionic polyacrylamide which can be used include those made into terpolymers by partly replacing their acrylamide units by acrylnitrile, an acrylic acid ester, styrene or so on, partial hydrolysis products of polyacrylamides, and the like. Their suitable molecular weights are within the range of $0.5\times10^6$ to $2.0\times10^6$, preferably $0.8\times10^6$ to $1.4\times10^6$, measured by GPC method.

Such anionic polyacrylamides are added as an aqueous solution to water-diluted pulp slurry with stirring in order to homogeneously disperse them into pulp slurry. The proportion of anionic polyacrylamides added is preferably in the range of 0.1 to 3.0% by weight, particularly 0.3 to 1.5% by weight, based on bone dry pulp.

The above-described anionic polyacrylamides are fixed to pulp by addition of a water-soluble aluminum salt and/or a cationic polyacrylamide to the pulp slurry. Water-soluble aluminum salts suitable in particular for the foregoing purpose are aluminum sulfate and aluminum chloride.

Cationized starch which can be used as cationic substance in the present invention include those obtained by introducing cationic groups into ordinary starch such as corn starch, potato starch, tapioca starch, flour starch, rice starch, sweet potato starch, etc. Methods of preparing cationized starch are known. Specifically, starch can be cationized with ease by introducing thereinto at least one basic nitrogen originated in a primary, secondary or tertiary amine, or a quaternary ammonium group.

In particular, it is preferable to use as the cationized starch one which contains basic nitrogen atoms originated in a tertiary amine or quaternary ammonium group.

It is desirable that such a cationized starch be added in a proportion of from 0.1 to 3.0% by weight, based on bone dry pulp.

As for the water-soluble aluminum salts which can be used as cationic substance, aluminum sulfate and aluminum chloride are preferred in particular.

It is desirable that such a salt be added in a proportion of from 0.1 to 2.0% by weight, preferably from 0.2 to 1.0% by weight, based on bone dry pulp.

When the pH of pulp slurry shifts to the acidic side by the addition of polyvalent metal salts as described above, it is desired to add an alkaline compound, such as sodium hydroxide, sodium hydrogen carbonate, sodium aluminate or the like, in order to control the pH to a neutral region, namely the region of 6.0 to 7.5. This pH control is effective in ensuring good keeping quality to a photographic printing paper support as well as raw paper.

A further cationic substance which can be used is polyamidepolyamine epichlorohydrin. It is desirably added in a proportion of 0.1 to 1.0% by weight to the pulp.

Additionally, the pulp slurry may further contain dyes, a brightening agent, an antifoaming agent and so on.

As for the sizing agent, in addition to the above-described epoxidized fatty acid amides, there may be used alkylketene dimers, higher fatty acid salts, alkenylsuccinic anhydrides, higher fatty acid anhydrides and so on.

An anionic colloidal silica and an anionic bentonite used in the present invention belong to anionic inorganic colloids. Specific examples of such colloids include colloidal montmorillonite, colloidal bentonite, titanyl sulfate sol, silica sol, aluminum-modified silica sol, aluminum silicate sol, and so on.

The amount of an artionic colloid added is in the range of 0.005 to 1% by weight, preferably 0.01 to 0.5% by weight, based on the dry pulp used. When the amount added is less than 0.005% by weight, cohesiveness imparted by the anionic colloid to pulp fibers is so insufficient that the intended effect cannot be achieved. On the other hand, the anionic colloid added in an amount greater than 1% by weight causes the agglutination of pulp fibers, and thereby disorder the formation. Thus, the finished goods suffer considerable deterioration in properties as well as appearance, and that a rise in price.

The anionic colloidal silica asses the form of polysilicate or colloidal silicate sol. When it is used as colloidal silicate sol, the best result can be brought about. Further, it is desired that the colloidal silica have a specific surface area of about 50 to about 1,000 $m^2/g$, and the average particle diameter thereof is not greater than 60 nm, preferably not greater than 20 nm, particularly preferably in the range of about 1 nm to about 10 nm.

The term "anionic bentonite" means superfine clay containing montmorillonite as main mineral, which is treated with a proper base, if needed. That is, it is a stratiform silicate which swells in water.

The anionic bentonite used suitably in the present invention is one which comprises thin tabular grains. In particular, one which has a specific surface area of abut 50 to about 1,000 $m^2/g$ is favored.

The epoxidized higher fatty acid amides can satisfactorily exhibit their sizability even when it is added at any stage of papermaking. However, adding them during the first half period is advantageous in that higher sizability is attained because they can be dispersed more homogeneously.

Also, a wet strength reinforcer, such as polyamidepolyamine epichlorohydrin, used when desired, may be added at any stage of papermaking.

The raw paper substrate made as described above may be impregnated or coated with a solution containing various water-soluble additives by means of a size press, a tub size, a gate roll coater or the like. Specific examples of water-soluble additives as described above include high molecular compounds such as starch, polyvinyl alcohol, carboxy-modified polyvinyl alcohol, carboxymethyl cellulose, hydroxyethyl cellulose, sodium alginate, cellulose sulfate, gelatin, casein, etc., and metal salts such as calcium chloride, sodium chloride, sodium sulfate, etc.

To the solution containing water-soluble additives as cited above, there may be further added a hygroscopic compound such as glycerol, polyethylene glycol or the like, a coloring or brightening material such as dyes, an optical whitening agent or the like, and a pH controlling agent such as sodium hydroxide, aqueous ammonia, hydrochloric acid, sulfuric acid, sodium carbonate, etc. In addition, pigments may be added to the foregoing solution, if needed.

The raw paper substrate is not particularly restricted in its species and thickness. However, it is desired that the substrate have a basis weight ranging from 50 to 250 $g/m^2$. Further, it is preferable that the substrate be subjected to a surface treatment by applying thereto heat and pressure with a machine calender or a super calender, because a raw paper having excellent surface smoothness and flatness is required from the standpoint of ensuring satisfactory flatness to the photographic printing paper.

Specific examples of a polyolefin resin with which the raw paper is coated on the both sides include α-olefin homopolymers, such as polyethylene, and mixtures of various polyolefins. In particular, high density polyethylene, low density polyethylene and the mixture thereof are preferred over others. These polyolefins are not particularly limited in their molecular weight, provided that it is possible to add a white pigment and a colored pigment, or a brightening agent to the coats made therefrom by an extrusion coating method. However, polyolefins having their molecular weights in the range of 20,000 to 200,000 are generally used.

The polyolefin resin coats don't have any particular restriction as to the thickness. They can have a thickness properly chosen from the range in which polyolefin layers for conventional photographic printing paper supports have their thickness. In general, the thickness is in the range of 15 to 50 μm.

To the polyolefin resin coats, there can be added a white pigment, a coloring pigment or brightening agent, and a stabilizing agent such as phenol, bisphenol, thiobisphenol, amines, benzophenone, salicylates, benzotriazole and organometallic compounds.

In particular, it is preferable that a white pigment and a coloring pigment be added to the polyolefin resin coat provided on the photographic emulsion-coated side.

In providing polyolefin resin coats on the raw paper by an extrusion coating method, ordinary extruders and laminators for polyolefins can be used.

The photographic printing paper support of the present invention is coated with photographic emulsions on the glossy side thereof, and then dried. The thus obtained material serves for photographic printing paper. Also, the present support can be used in accordance with other various embodiments in preparing photographic printing paper. For instance, a printed letter-holding layer can be provided on the back side of the support, as described in JP-A-62-6256.

In embodiments of the present invention, a photographic printing paper support uses a raw paper which contains an epoxidized higher fatty acid amide, a cationic substance and anionic colloidal silica and/or anionic bentonite, and has polyolefin coats on the both sides. Thus, the penetration of a developer into the support via the border as cut surfaces can be reduced to a considerable extent. Further, improvement in drainage on wire cloth in a paper-making step can be effected; besides the production cost can be reduced.

The present invention will now be illustrated in more detail by reference to the following examples. Additionally, the amounts of ingredients used are expressed in terms of percent by weight (wt %) based on bone dry pulp.

EXAMPLE 1

A pulp slurry having Canadian freeness of 250 ml was obtained by beating a wood pulp mixture (LBKP/NBSP=2/1). Then, the concentration of the pulp slurry was adjusted to about 3.5 wt %, and thereto with agitating were added 1.0 wt % of an anionic polyacrylamide (constituted of 10 mole % of acrylic acid and 90 mole % of acrylamide, and having an average molecular weight of about $1.10\times10^6$), 1.0 wt % of aluminum sulfate, 0.1 wt % of polyamidepolyamine epichlorohydrin and 0.5 wt % of epoxidized behenamide. Further, sodium hydroxide was added thereto so as to adjust the pulp slurry to pH 7.0.

Then, 0.5 wt % of a cationic polyacrylamide (molecular weight: $9.0\times10^5$, cation number: 2.8 ml/g) and 0.1 wt % of an antifoaming agent were added with agitating, and the resulting pulp slurry was further adjusted so as to have the pulp concentration of 1.0 wt %. Thereafter, 0.05 wt % of anionic colloidal silica (BMA-O, trade name, produced by NISSAN-EKANOBEL Co., Ltd. ) was added with agitating. The thus obtained pulp slurry was subjected to water-draining and drying operations to provide a raw paper. Therein, the paper-making operation was performed so that the raw paper having a basis weight of 180 $g/m^2$ might be made.

EXAMPLE 2

To the pulp slurry prepared from the same wood pulp mixture as used in Example 1 and adjusted so as to have a pulp concentration of abut 3.5 wt %, 1.5 wt % of an amphoteric polyacrylamide (constituted of 2 mole % of itaconic acid, 5 mole % of dimethylaminopropylacrylamide sulfate and 93 mole % of acrylamide, and having an average molecular weight of $2.50\times10^6$), 0.3 wt % of aluminum sulfate, 0.1 wt % of polyamidepelyamine epichlorohydrin and 0.75 wt % of epoxidized behenamide were added with agitating. The resulting pulp slurry was adjusted to pH 7.0 by the addition of sodium hydroxide. Then, the pulp slurry was adjusted so as to have a pulp concentration of 0.5 wt %. Thereafter, 0.2 wt % of anionic bentonite (Organosorb, trade name, produced by Alloid Colloid Co., Ltd. ) was added with agitating. The thus obtained pulp slurry was subjected to water-draining and drying operations to provide a raw paper. Therein, the paper-making operation was performed so that the raw paper having a basis weight of 180 $g/m^2$ might be made.

EXAMPLE 3

To the pulp slurry prepared from the same wood pulp mixture as used in Example 1 and adjusted so as to have a pulp concentration of abut 3.5 wt %, 0.5 wt % of the same anionic polyacrylamide as used in Example 1, 0.3 wt % of aluminum sulfate, 0.1 wt % of polyamidepolyamine epichlorohydrin, 0.5 wt % of epoxidized behenamide and 0.25 wt % of an alkylketene dimer were added with agitating. The alkylketene dimer used herein was the product obtained using as starting material the higher fatty acid mixture constituted of 93 wt % of $C_{20}H_{41}$—$CH_2$—COOH, 5 wt % of $C_{18}H_{37}$—$CH_2$—COOH and 2 wt % of $C_{16}H_{33}$—$CH_2$—COOH. The resulting pulp slurry was adjusted to pH 7.0 by the addition of sodium hydroxide. Thereto, 1.5 wt % of the same amphoteric polyacrylamide as used in Example 2 was further added with agitating. Then, the pulp slurry was adjusted so as to have a pulp concentration of 1.5 wt %. Thereafter, 0.05 wt % of artionic colloidal silica (BMA-O, trade name, produced by NISSAN-EKANOBEL Co., Ltd. ) was added with agitating. The thus obtained pulp slurry was subjected to water-draining and drying operations to provide a raw paper. Therein, the paper-making operation was performed so that the raw paper having a basis weight of 180 g/m$^2$ might be made.

EXAMPLE 4

To the pulp slurry prepared from the same wood pulp mixture as used in Example 1 and adjusted so as to have a pulp concentration of about 3.5 wt %, 2.0 wt % of cationized starch (Cato-F, trade name, produced by Ohji National Co. ), 0.2 wt % of polyamidepolyamine epichlorohydrin, 0.4 wt % of epoxidized behenamide and 0.3 wt % of the same alkylketene dimer used in Example 3 were added with agitating. The resulting pulp slurry was adjusted to pH 7.0 by the addition of sodium hydroxide. Then, the pulp slurry was adjusted so as to have a pulp concentration of 1.0 wt %. Thereafter, 0.05 wt % of anionic colloidal silica (BMA-O, trade name, produced by NISSAN-EKANOBEL Co., Ltd. ) was added with agitating. The thus obtained pulp slurry was subjected to water-draining and drying operations to provide a raw paper. Therein, the paper-making operation was performed so that the raw paper having a basis weight of 180 g/m$^2$ might be made.

EXAMPLE 5

A raw paper was prepared in the same manner as in Example 4, except that the amounts of the epoxidized behenamide and the alkylketene dimer added as a sizing agent were changed from 0.4 wt % to 0. 2 wt % and from 0.3 wt % to 0.6 wt % respectively.

EXAMPLE 6

A raw paper was prepared in the same manner as in Example 4, except that the amounts of the epoxidized behenamide and the alkylketene dimer added as a sizing agent were changed from 0.4 wt % to 0 wt % and from 0.3 wt % to 0.6 wt % respectively.

COMPARATIVE EXAMPLE 1

A raw paper was prepared in the same manner as in Example 1, except that the anionic colloidal silica was not added. Additionally, the paper-making operation was performed so that the raw paper might have a basis weight of 180 g/m$^2$.

COMPARATIVE EXAMPLE 2

A raw paper was prepared in the same manner as in Example 1, except that the pulp concentration of the pulp slurry was adjusted to 3. 0 wt % prior to the addition of the anionic colloidal silica and the amount of the anionic colloidal silica added was changed to 0.001 wt %. Additionally, the paper-making operation was performed so that the raw paper might have a basis weight of 180 g/m$^2$.

COMPARATIVE EXAMPLE 3

A raw paper was prepared in the same manner as in Example 4, except that the oxidized starch (MS #3600, trade name, NIHON SHOKUHIN KAKO Co. Ltd.) was used in place of the cationized starch and added in a concentration of 3.0 wt %, and excluding therefrom the addition of the anionic colloidal silica. Additionally, the paper-making operation was performed so that the raw paper might have a basis weight of 180 g/m$^2$.

The thus prepared raw paper samples were each evaluated as follows:

(i) The paper stock obtained after all the ingredients had been added to the pulp slurry in each of the foregoing Examples and Comparative Examples was allowed to stand for 60 minutes, and examined as to whether tony agglutinate was generated or not. In every case, generation of agglutinate was not observed.

(ii) The paper stock obtained after all the ingredients had been added to the pulp slurry in each of the foregoing Examples and Comparative Examples was weighed out in the amount of 3 g on a dry basis, and the freeness (CSF) thereof was determined according to JIS-P8121. The results obtained are shown in Table 1.

(iii) On the surface of each raw paper sample, which was prepared in the manner as described above and had a basis weight of 180 g/m$^2$, a solution having the following composition was coated with a size press so as to have a coverage amount of 30 g/m$^2$:

| Composition of Sizing Solution | |
|---|---|
| Polyvinyl alcohol | 5.0 wt % |
| Calcium chloride | 4.0 wt % |
| Brightening agent | 0.5 wt % |
| Antifoaming agent | 0.005 wt % |
| Water | 90.495 wt % |

The thickness of the thus sized paper was adjusted to 173 μm with a machine calender, and then the back surface thereof was subjected to a corona discharge treatment. Subsequently, a polyethylene having the density of 0.980 g/m$^2$ was coated thereon in a layer having a thickness of about 30 μm. Further, the front surface (photographic emulsion-coated side) of the sized paper was subjected to a corona discharge treatment, and then coated with a polyethylene having the density of 0.960 g/m$^2$ and containing 10 wt % of titanium oxide so that the thickness of the coat might be about 30 μm. Thus, a sample of photographic printing paper support was obtained.

From each support sample was cut three test pieces measuring 10 cm×1.5 cm in size. These test pieces were dipped in a P1 solution (developer) containing development-processing chemicals for color paper (CP-40E, trade name, produced by Fuji Photo Film Co., Ltd. ) at 35° C. for 45 seconds, and then taken out therefrom. Immediately thereafter, they were wiped quickly. Further, they were dipped in a P2 solution (a bleach-fix solution) at 35° C. for 45 seconds, and then the surfaces thereof were wiped similarly to the above. Furthermore, they were dipped in water at 30° C. for 90 seconds, &nd then wiped similarly. The thus processed test pieces each were examined for increment of weight, and therefrom was estimated the total amount of the solutions penetrated into each support sample via the cut surfaces thereof. This increment of weight was employed as an index to sizability. The increments determined are shown in Table 1.

TABLE 1

| | Freeness just before Papermaking (ml) | Sizability (Increment of Weight: mg) |
|---|---|---|
| Example 1 | 293 | 10 |
| Example 2 | 300 | 8 |
| Example 3 | 290 | 7 |
| Example 4 | 290 | 13 |
| Example 5 | 290 | 9 |
| Example 6 | 285 | 11 |
| Compar. Example 1 | 265 | 15 |
| Compar. Example 2 | 250 | 11 |
| Compar. Example 3 | 260 | 15 |
| Standard | 280 | 15 |

As can be seen from Table 1, the photographic printing paper supports of the present invention have not only higher freeness, that is, improved drainage rate bat also higher sizability, that is, reduced pentration of a developer.

What is claimed is:

1. A photographic printing paper support which comprises a raw paper having polyolefin resin coats on the both sides, said raw paper being a paper made from pulp slurry containing an alkylketene dimer and a cationic substance other than epoxidized higher fatty acid amides by the addition thereto in an early stage of the preparation and further containing anionic colloidal silica added in a late stage of the preparation after controlling the pulp concentration so as to range from 0.1 to 1.5%.

2. The photographic printing paper support of claim 1, wherein the cationic substance other than epoxidized higher fatty acid amides includes at least one substance selected from a group consisting of aluminum salts, polyamidepolyamine epichlorohydrins, cationic polyacrylamides, amphoteric polyacrylamides and cationized starch.

3. The photographic printing paper support of claim 1, wherein the proportion of anionic colloidal silica is in the range of 0.005 to 1% by weight, based on bone dry pulp.

4. The photographic printing paper support of claim 1, wherein the anionic colloidal silica has specific surface area of from about 50 to about 1,000 $m^2/g$.

5. The photographic printing paper support of claim 1, wherein the proportion of an alkylketene dimer is in the range of 0.05 to 5.0% by weight, based on bone dry pulp.

6. The photographic printing paper support of claim 1, wherein the proportion of an alkylketene dimer is in the range of 0.1 to 1.5% by weight, based on bone dry pulp.

7. The photographic printing paper support of claim 1, wherein the pulp slurry is further adjusted to pH 6.0–7.5 in making the paper therefrom.

8. The photographic printing paper support of claim 2, wherein the aluminum salt as the cationic substance is aluminum sulfate or aluminum chloride.

9. The photographic printing paper support of claim 2, wherein the cationic polyacrylamide as the cationic substance is a copolymer of acrylamide and a cationic monger.

10. The photographic printing paper support of claim 9, wherein the copolymer has an average molecular weight of $0.50\times10^6$ to $1.50\times10^6$ and a cation number of 1.5 to 5.0.

11. The photographic printing paper support of claim 9, wherein the cationic monomer includes those respectively represented by the following general formulae (I) and (II) and salts thereof:

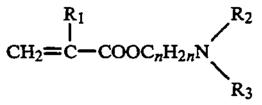

(I)

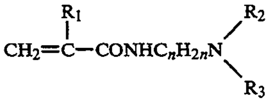

(II)

wherein $R_1$ represents a hydrogen atom or a lower alkyl group, $R_2$ and $R_3$ each represent a lower alkyl group, and n represent an integer of from 1 to 5.

12. The photographic printing paper support of claim 2, wherein the amphoteric polyacrylamide as the cationic substance is a terpolymer of acrylamide or methacrylamide, a cationic monomer and an anionic monomer.

13. The photographic printing paper support of claim 11, wherein the cationic monomer includes dialkylaminoalkylmethacrylates, salts thereof, dialkylaminoalkylacrylamides and salts thereof, and wherein the anionic monomer includes acrylic acid, methacrylic acid and itaconic acid.

* * * * *